Dec. 21, 1965   G. W. WILLITS, JR   3,224,650
METERING VALVE STRUCTURE
Filed Oct. 14, 1964   2 Sheets-Sheet 1

INVENTOR
GEORGE W. WILLITS JR.
BY
Margell, Johnston, Cook & Root
ATTORNEYS

INVENTOR
GEORGE W. WILLITS JR

BY
Marshall, Johnston, Cook & Root
ATTORNEYS

United States Patent Office 3,224,650
Patented Dec. 21, 1965

3,224,650
METERING VALVE STRUCTURE
George W. Willits, Jr., 1S 537 Kenilworth,
Glen Ellyn, Ill.
Filed Oct. 14, 1964, Ser. No. 403,871
5 Claims. (Cl. 222—207)

This invention relates in general to a combination container and metering device capable of holding a quantity of dry granular or powdered material and of dispensing measured amounts of the material in accordance with the desires of the user.

The present invention includes a body having a storage chamber and a measuring pocket wherein the material of the storage chamber is flowable into the measuring pocket. The measuring pocket is operable to shut off the flow of material from the storage chamber and to then dispense the material from the pocket by an amount equal to the capacity of the pocket. Thereafter continued cycles of filling the pocket and dispensing the material therefrom may be produced.

It is therefore an object of the present invention to provide a combination container and dispensing device for dispensing measured amounts of dry granular or powdered material.

Another object of this invention is in the provision of a combination container and dispensing device that may be easily and inexpensively manufactured to provide a unit that is economically marketable at a low cost.

Another object of this invention resides in the provision of a combination container and dispensing device for dispensing measured amounts of dry granular or powdered material which has a minimum of working and movable parts and which may be easily operated.

A further object of this invention is to provide a combination container and dispensing device that may be constructed of low cost, presently available, synthetic polymer materials to provide an inexpensive container that may be employed for packaging consumer products.

Other objects, features and advantages of the invention will be apparent from the following detailed disclosure, taken in conjunction with the accompanying sheets of drawings, wherein like reference numerals refer to like parts, in which.

Figure 1:
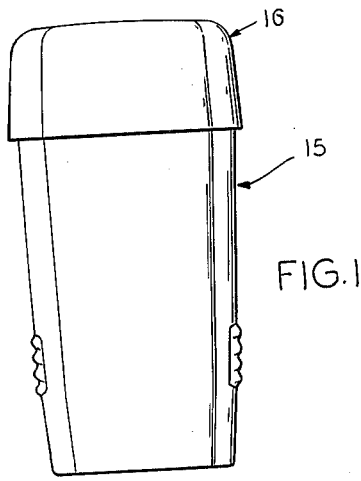
FIG. 1 is a front elevational view of a combination container and dispensing device in accordance with the invention.
Figure 2:
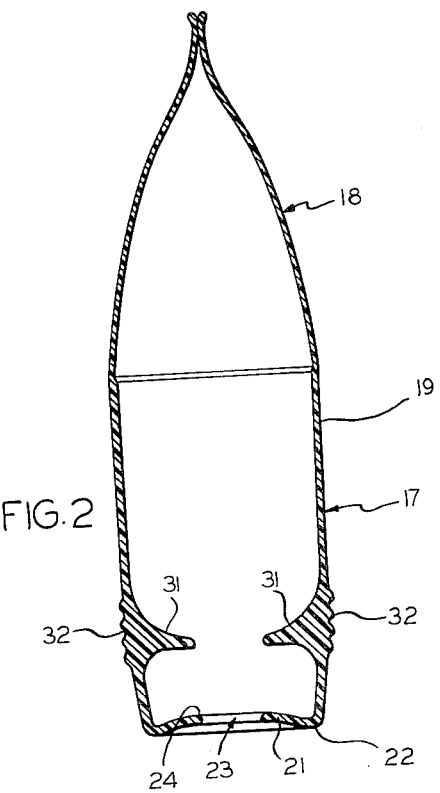
FIG. 2 is a vertical axial sectional view of the embodiment of FIG. 1 and illustrating the device in unassembled form.
Figure 5:
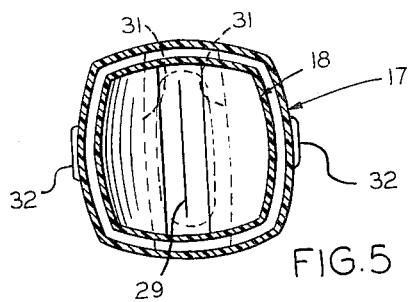
FIG. 5 is a transverse sectional view taken substantially along line 5—5 of FIG. 3.

Referring now to the drawings and particularly to the embodiment shown in FIGS. 1–5, the combination container and dispensing device shown therein includes a body 15 having a cover 16 over the upper end. The body 15 comprises an outer shell 17 and an inner shell 18, both made of a resilient, synthetic, organic polymer such as polyethylene or the like. Any other suitable resilient or flexible material may be employed if so desired. As shown in FIG. 2, the inner and outer shells may be made together by any desired process, such as by blow or injection molding. For example, the inner and outer shells may be made in identical halves and thereafter secured together. Upon completion of making the body as shown in FIG. 2, the inner shell 18 is invaginated within the outer shell 17 to define the structure shown in FIG. 3. The transverse cross-sectional shape of the inner and outer shells may take the rectangular form as shown in FIG. 5 or any other desired geometrical form.

The outer shell 17 includes substantially vertically extending portions 19 at the upper end and a slight tapered portion 20 at the lower end. In the embodiment shown, the upper end of the inner shell or liner 18 is integrally formed with the upper end of the outer shell 17, although it may be appreciated that the inner shell may be made separately and thereafter suitably secured to the outer shell. A bottom wall 21 is provided at the lower end of the tapered portion 20 and in slightly relieved form from the very lower end of the tapered portion 20 whereby the continuous rim 22 is defined for engaging the surface upon which the combination container and dispensing device is placed. An opening 23 is provided at the central area of the bottom wall 21 and of any desired configuration thereby defining a lip 24.

Figure 3:
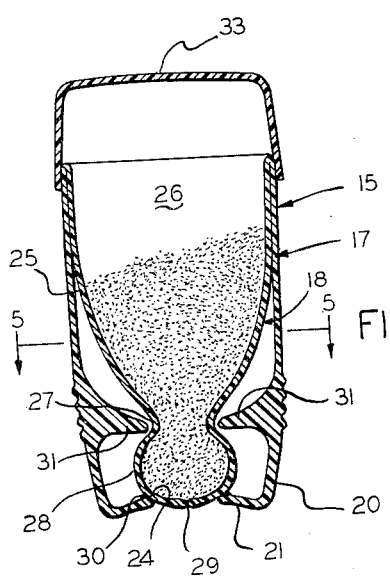
FIG. 3 is a vertical axial sectional view taken through the embodiment of FIG. 1 and showing the measuring pocket or pouch in position to receive the material from the storage chamber and in the normal position when the device is not in use.

Upon invaginating the inner shell or lining 18, the shell takes the form as shown in FIG. 3, wherein the upper portion 25 defines a storage chamber 26. The lower end of the upper portion 25 tapers inwardly to define a necked portion 27 below which is located a balloon-like measuring pocket or pouch 28. The pocket 28 is closed at the lower end but provided with a slit 29 that is selectively openable to discharge the contents of the measuring pocket 28. But in the closed position as shown in FIG. 3, the measuring pocket 28 does not permit the escape of any of the material therein. Looking at FIG. 3, the upper end of the measuring pocket 28 may be considered the loading or inlet end thereof, while the lower end of the pocket may be considered the dispensing or outlet end thereof. The outer surface of the pocket 28 at the lower end thereof is secured to the continuous lip 24 of the bottom wall 21 of the outer shell 17 by means of heat sealing at 30. Other means or methods may be employed to secure the pocket 28 to the bottom wall 21.

A pair of inwardly projecting ribs or bars 31 are mounted and preferably integral with the inner surface of the outer shell 17 and in alignment with the ribs or bars 31 as shown in the drawings.

Figure 4:
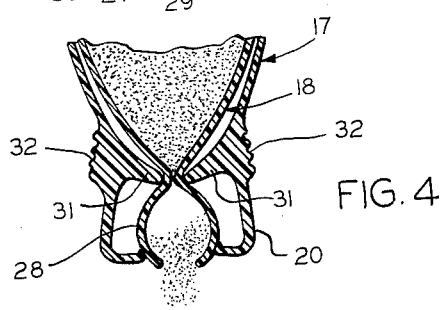
FIG. 4 is a fragmentary sectional view similar to FIG. 3 and illustrating the position of the parts when the dispensing device is in dispensing position.
Figure 6:
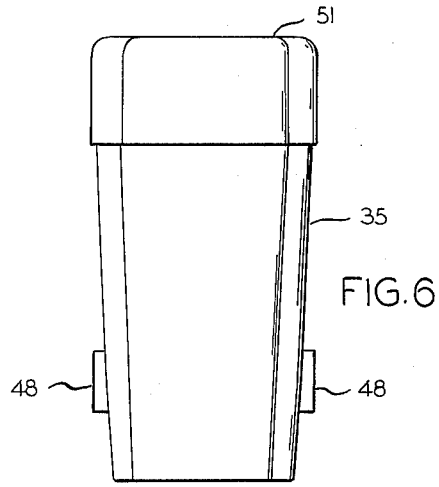
FIG. 6 is a front elevational view of a modification of the present invention.

In operation, the storage chamber 26 is loaded with material from the upper open end and may be thereafter closed by means of a cover member 33. The combination container and dispensing device then takes the form as shown in FIG. 3. In order to dispense material from the container in measured amounts, the fingers of the user may be employed for engaging the finger engaging portions 32 to thereafter squeeze the body to bring the bars or ribs 31 toward each other. As they are brought together, the bars or ribs 31 close the necked portion 27 to prevent further material from flowing into the measuring pocket 28. Thereafter continued squeezing action on the finger engaging portions 32 causes the opening of the measuring pocket 28 at the slit 29 to discharge the contents of the measuring pocket as shown in FIG. 4. In this regard, the edges of the bars 31 acts as a fulcrum point for pulling the opposed sides of the tapered portion 20 away from each other to thereby pull the opposite sides of the measuring pocket 28 apart and open the slit 29. The necked portion 27 remains closed during the entire time that the slit 29 is open and while the contents of the measuring pocket are being dispensed. Thereafter, releasing of the pressure on the finger engaging portions 32 first permits closing of the measuring pocket at its discharge end to close the slit 29 and then open the necked portion 27 or the loading end of the pocket to permit material from the storage chamber 25 to flow freely into the measuring pocket for the next dispensing operation. The finger engaging portions 32 may merely be roughened or embossed to indicate to the user the location for applying the pressure to squeeze the body and cause the dispensing cycle.

Referring now to the embodiment of FIGS. 6-12, it should be understood that the operation and general principle remains the same as that associated with the embodiment of FIGS. 1-5, but that the construction is somewhat different, especially in that the combination container and dispensing device may be made in two separate parts. As seen particularly in FIGS. 7, 8 and 9, this embodiment includes an outer shell 35 having a liner or inner shell 36 that is preferably integral with the dispensing device 37. Again, the cross-sectional configuration may be in the form as shown in the embodiment of FIGS. 1-5, or it may take any other desired form.

The outer shell 35 is provided with opposed and aligned openings 38 in the opposite walls and a bottom wall 39 having an opening 40, oval or otherwise shaped. Further, the bottom wall 39 is again relieved to form a ridge 41 which engages the surface upon which the device is placed. The upper end of the shell is open. The outer shell 35 may be made of resilient material although such is not necessary, and therefore it may be made of a more inexpensive rigid-type material.

The inner shell or liner 36 includes upper wall portions 42 defining the storage chamber 43 and secured at the lower end to the dispensing device 37. The dispensing device includes a central body 44 that is relatively flat in configuration and provided with a measuring pocket 45. The body includes opposite side walls 46 having secured centrally thereto operating bars 47 that extend outwardly and slightly upwardly and terminate in buttons 48 that slidably extend through the openings 38 in the outer shell 35. The buttons 48 are flanged at their inner ends at 49 to properly position the dispensing device 37 between the opposite side walls of the outer shell 35.

Figure 7:
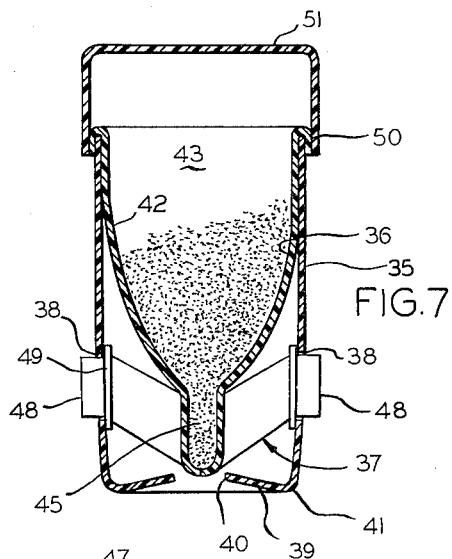
FIG. 7 is a vertical axial view taken through the embodiment of FIG. 6 and showing the measuring pocket in loading position.
Figure 10:
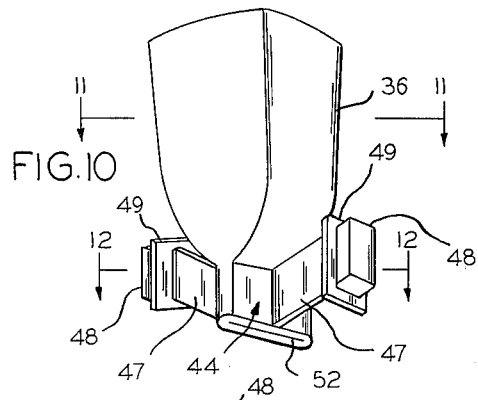
FIG. 10 is a perspective view of the liner and dispensing device removed from the outer shell.

As seen in FIG. 7, the upper periphery of the wall portions 42 are provided with a turned-over lip 50 that engages over the upper end of the outer shell 35 to also aid in properly positioning the wall portions 42 within the outer shell 35. A cover member 51 may be provided to close the upper open end of the storage chamber 43.

As can be appreciated, the outer shell 35 may be molded in one piece and the inner shell 36 with the dispensing device 37 molded in one piece so that the inner shell 36 and dispensing device may be quickly and easily assembled with respect to the outer shell 35 and thereafter provided with a cover member 51 to define a completed structure.

Figure 8:
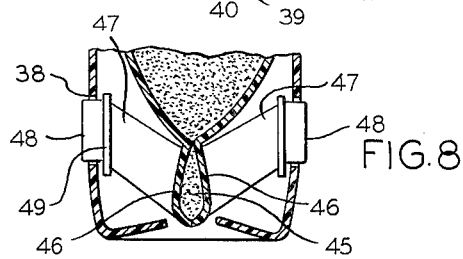
FIG. 8 is a fragmentary view similar to FIG. 7 and showing a measuring pocket wherein it is closed from the storage chamber and prior to the dispensing operation.
Figure 11:
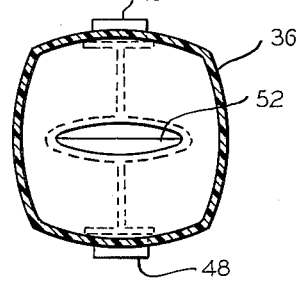
FIG. 11 is a transverse sectional view taken substantially along line 11—11 of FIG. 10.
Figure 9:
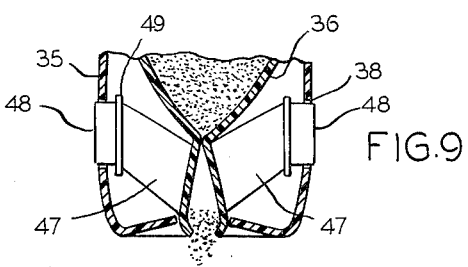
FIG. 9 is a sectional view similar to FIG. 8 and showing the position of the parts when the measuring pocket is in dispensing position.
Figure 12:
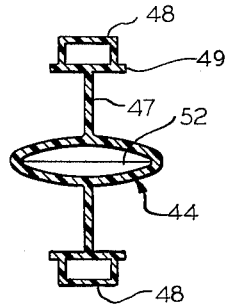
FIG. 12 is a transverse sectional view taken substantially along line 12—12 of FIG. 10.

In operation, the embodiment of FIGS. 6-12 operates like the embodiment of FIGS. 1-5 wherein material from the storage chamber 43 flows into the measuring pocket 45, making the device ready for dispensing a measured amount of material. Thereafter, pressure is applied to the dispensing device by squeezing the buttons 48 and moving them toward each other to first close the inlet or loading end of the pocket 45 as shown in FIG. 8, and thereafter open the dispensing end and slit 52 as shown in FIG. 9 to dispense the material from the measuring pocket 45. It should be appreciated that the amount of material dispensed will equal the capacity of the measuring pocket 45 and that this can be varied to suit the requirements of the unit. Following the dispensing operation, the releasing of pressure on the buttons 48 permits the dispensing end of the pocket to close first and thereafter the loading end of the pocket to open to permit more material to flow into the pocket. The dispensing cycle may then be repeated. While the outer shell 35 may be made of a rigid synthetic polymer, it should be appreciated that the inner shell 36 and the dispensing device 37 must be made of a flexible or resilient synthetic polymer. Further, the operation of this embodiment, being substantially the same as the operation of the embodiment of FIGS. 1-5, causes the lower end of the pocket to be spread apart and opened upon the closing of the upper end of the pocket about a fulcrum established by the upper engaging edges of the pocket.

It will be understood that modifications and variations may be effected without departing from the scope of the novel concepts of the present invention, but it is understood that this application is to be limited only by the scope of the appended claims.

The invention is hereby claimed as follows:

1. A combination container and dispensing device for dispensing measured quantities of dry granular or powdered material comprising, an upstanding body of resilient material having first wall portions at the upper end defining a storage chamber, said wall portions being arranged to define an upper open end and a lower open end substantially smaller than said upper open end, second wall portions at the lower end of the body defining a measuring pocket, said second wall portions having an upper normally open end connected to the lower end of the storage chamber and a normally closed lower end having a slit therein, and means for first closing the upper open end of said pocket and then opening the lower closed end thereof to dispense the contents of the pocket, said means including bar means engageable with the second wall portions at the upper end of the pocket and connected to the second wall portions at the lower end of the pocket.

2. A combination container and dispensing device for dispensing measured quantities of dry granular or powdered material comprising, an upstanding body of resilient material having first wall portions at the upper end defining a storage chamber, said wall portions being arranged to define an upper open end and a lower open end substantially smaller than said upper open end, second wall portions at the lower end of the body defining a measuring pocket, said second wall portions having an upper normally open end connected to the lower end of the storage chamber and a normally closed lower end having a slit therein, and means for first closing the upper open end of said pocket and then opening the lower closed end thereof to dispense the contents of the pocket, said means including opposed bars engageable on opposite sides of the second wall portions at the upper end of the pocket and connected to the second wall portions at the lower end of the pocket.

3. A combination container and dispensing device for dispensing measured quantities of dry granular or powdered material comprising, an upstanding body of resilient material having first wall portions at the upper end defining a storage chamber, said wall portions being arranged to define an upper open end and a lower open end substantially smaller than said upper open end, second wall portions at the lower end of the body defining a measuring pocket, said second wall portions having an upper normally open end connected to the lower end of the storage chamber and a normally closed lower end having a slit therein, and means for first closing the upper open end of said pocket and then opening the lower closed end thereof to dispense the contents of the pocket, said means including opposed bars engageable on opposite sides of the second wall portions at the upper end of the pocket and connected to the second wall portions at the lower end of the pocket, said bars extending substantially perpendicular to said slit.

4. A combination container and dispensing device for dispensing measured quantities of dry granular or powdered material comprising, an upstanding body of resilient material having first wall portions at the upper end defining a storage chamber, said wall portions being arranged to define an upper open end and a lower open end substantially smaller than said upper open end, second wall portions at the lower end of the body defining a measuring pocket, said second wall portions having an upper normally open end connected to the lower end of the storage chamber and a normally closed lower end having a slit therein, means for first closing the upper open end of said pocket and then opening the lower closed end thereof to dispense the contents of the pocket, said means including opposed bars connected to the opposite sides of said second wall portions, and an outer shell enclosing said body having an open upper end contiguous to the upper open end of said first wall portions and an opening in the lower end aligning with the slit in the second wall portions, said shell having openings in the side walls for slidably receiving said bars.

5. A combination container and dispensing device for dispensing measured quantities of dry granular or powdered material comprising, an upstanding body of resilient material including an outer tubular shell and an inner lining, said outer shell being open at the upper end and having a bottom wall at the lower end thereof, an opening in said bottom wall, said lining being open at the upper end and contiguous with the upper end of the outer shell, said lining being closed at the lower end and having a slit therein aligning with the opening in said bottom wall, a necked portion above the closed end of the liner defining with the closed end a measuring pocket, and bar means extending inwardly from the inner surface of the outer shell at the necked portion of the liner, whereby the squeezing of the outer shell causes the bar means to close the lining at the necked portion and thereafter open the slit to dispense the contents from the measuring pocket.

References Cited by the Examiner
UNITED STATES PATENTS

| | | | |
|---|---|---|---|
| 1,375,430 | 4/1921 | Walker | 222—447 |
| 2,219,604 | 10/1940 | Trotter | 222—207 |
| 2,488,854 | 11/1949 | Crane | 222—490 X |
| 2,772,817 | 12/1956 | Jauch | 222—207 |

M. HENSON WOOD, Jr., *Primary Examiner.*

LOUIS J. DEMBO, *Examiner.*